United States Patent Office 2,808,628
Patented Oct. 8, 1957

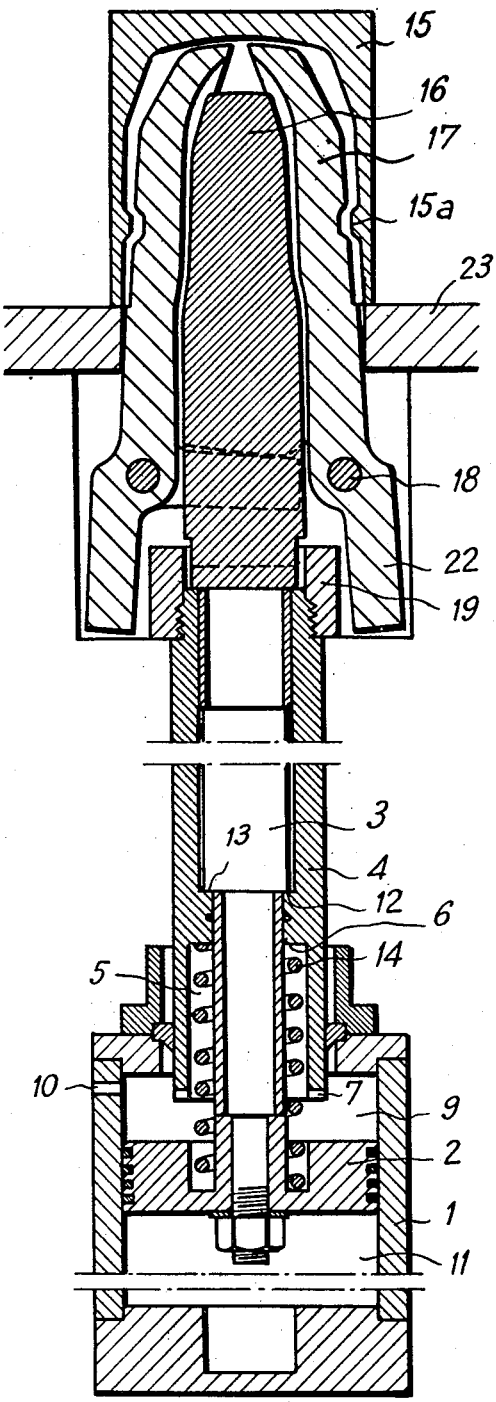

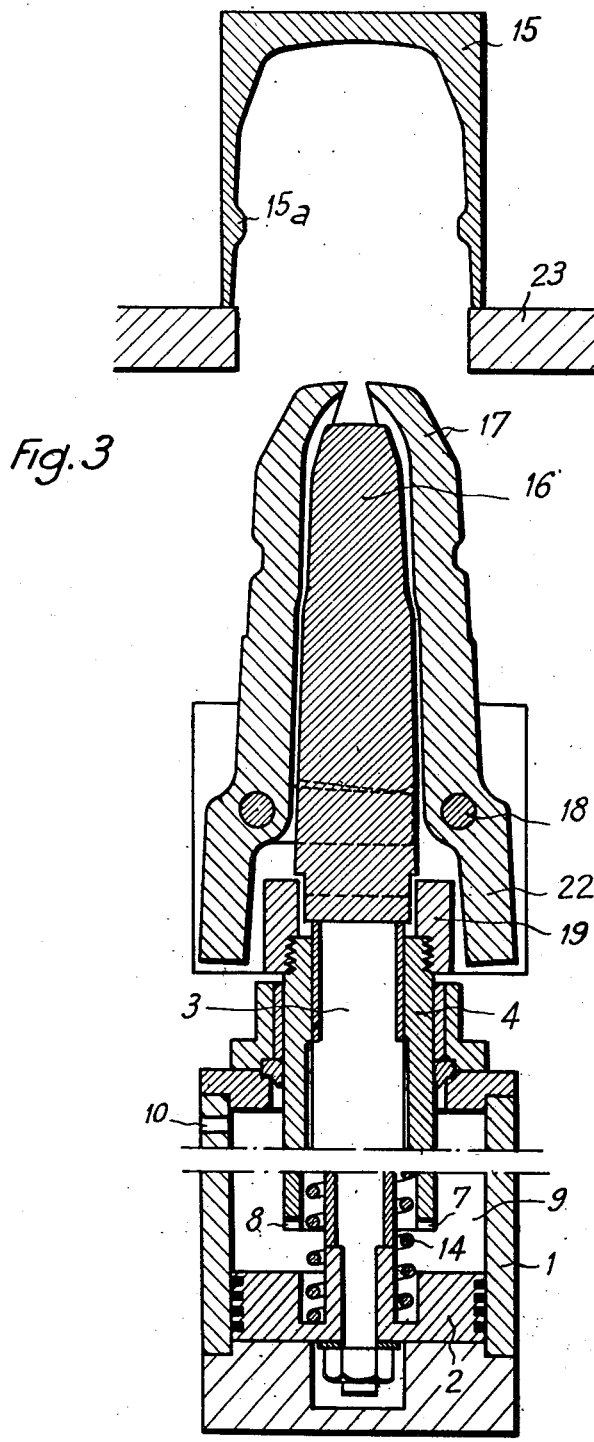

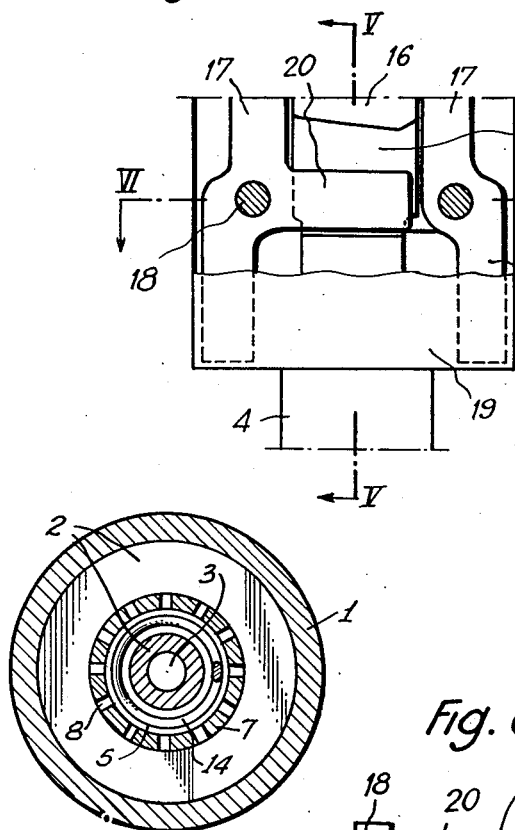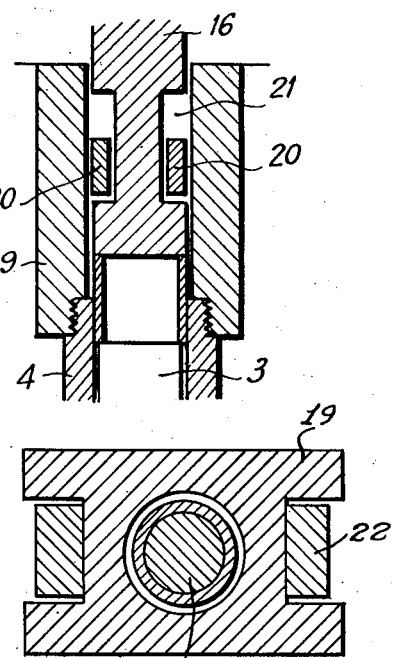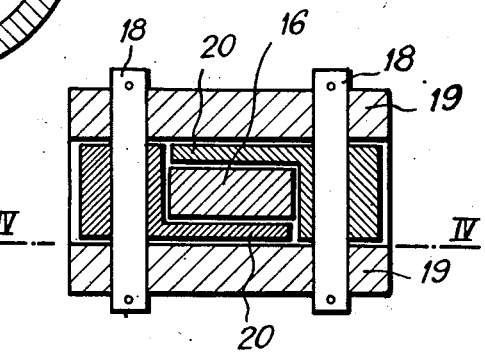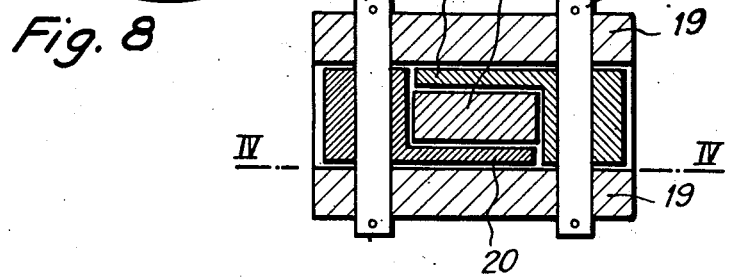

2,808,628

PNEUMATIC OR HYDRAULIC CONTROLLING DEVICE PARTICULARLY APPLICABLE TO THE STRIPPING OF MOULD CORES

Pierre Fouron, Chatenay-Malabry, and Georges Bourret, Boulogne, France, assignors to Société dite: Société Civile d'Études pour Materiel de Fonderie, Bagneux (Seine), France Application June 8, 1954, Serial No. 435,278

Claims priority, application France June 29, 1953

5 Claims. (Cl. 22—93)

This invention relates to controlling devices for the stripping of mould cores, and particularly to pneumatic or hydraulic devices of this kind, of the type comprising a piston reciprocating in a cylinder. The invention has for its object an improved device of this type, permitting, with one cylinder and in a single operation, to displace a first element of the mould in one direction while exerting on a second element of the mould a force directed in an opposite direction, and subsequently to displace this second element in the same direction as the first.

According to the invention, we provide a controlling pneumatic or hydraulic device of the type referred to, adapted to perform the stripping of a mould core consisting of two elements, comprising a first piston moveable in a cylinder and intended to be connected to the first element to be controlled, a second piston moveable with respect to the cylinder, the active surface of which is less than that of the first piston and intended to be connected to the second element to be controlled, a passage opening in the cylinder between the two pistons, a stop solid with the first piston and a stop solid with the second piston, these stops being so disposed that the first one meets the second one and carries it along after a certain displacement of the first piston.

It follows from this arrangement that when a fluid under pressure is sent into the cylinder, by the passage, the first piston moves in a certain direction, taking along with it the element of the core to which it is attached; the second piston is urged in the opposite direction and moves the second element in this latter direction, or at least exerts on it a thrust in that direction if the second element is prevented from moving. When the two stops come in contact, the first piston takes along with it the whole of the two elements with a force which depends on the difference of active surface of the two pistons.

The second piston is preferably annular and disposed round the rod of the first piston. Preferably also, the stops are constituted by shoulders provided on the rod of the first piston and on the second piston.

Resilient means tending to separate the two pistons are advantageously povided.

The controlling device according to the invention is particularly applicable to the stripping of mould cores consisting of several parts or elements, particularly in the case when the moulded piece comprises internal projections.

In the present application, the core comprises a central key element solid with the first piston and lateral elements pivotally mounted on a support solid with the second piston, and means are provided controlled by the relative displacement of the support and of the key element for causing the lateral elements to pivot inwardly.

When the controlling fluid under pressure is sent into the cylinder, the central key element comes out, at least partly, from the moulded piece, causing the lateral elements to pivot and to occupy the space left free by the key element, thereby disengaging themselves from the projections of the moulded piece, after which the whole of the core comes out of the latter piece.

Referring now to the accompanying drawings, which represent by way of non-limiting example a preferred embodiment of the controlling device according to the invention, as applied to the stripping of a mould core:

Fig. 2 is a similar view to that of Fig. 1 during stripping.

Fig. 3 is a similar view to that of Fig. 1 or Fig. 2 at the end of the stripping.

Fig. 4 represents the mechanism for the pivoting of the lateral elements of the core and is a section along IV—IV of Fig. 6.

Fig. 5 is a section of this mechanism along V—V of Fig. 4.

Fig. 6 is a section of this mechanism along VI—VI of Fig. 4.

Figs. 7 and 8 are, respectively, sectional views of the device of Fig. 1 along lines VII—VII and VIII—VIII.

Figure 1:
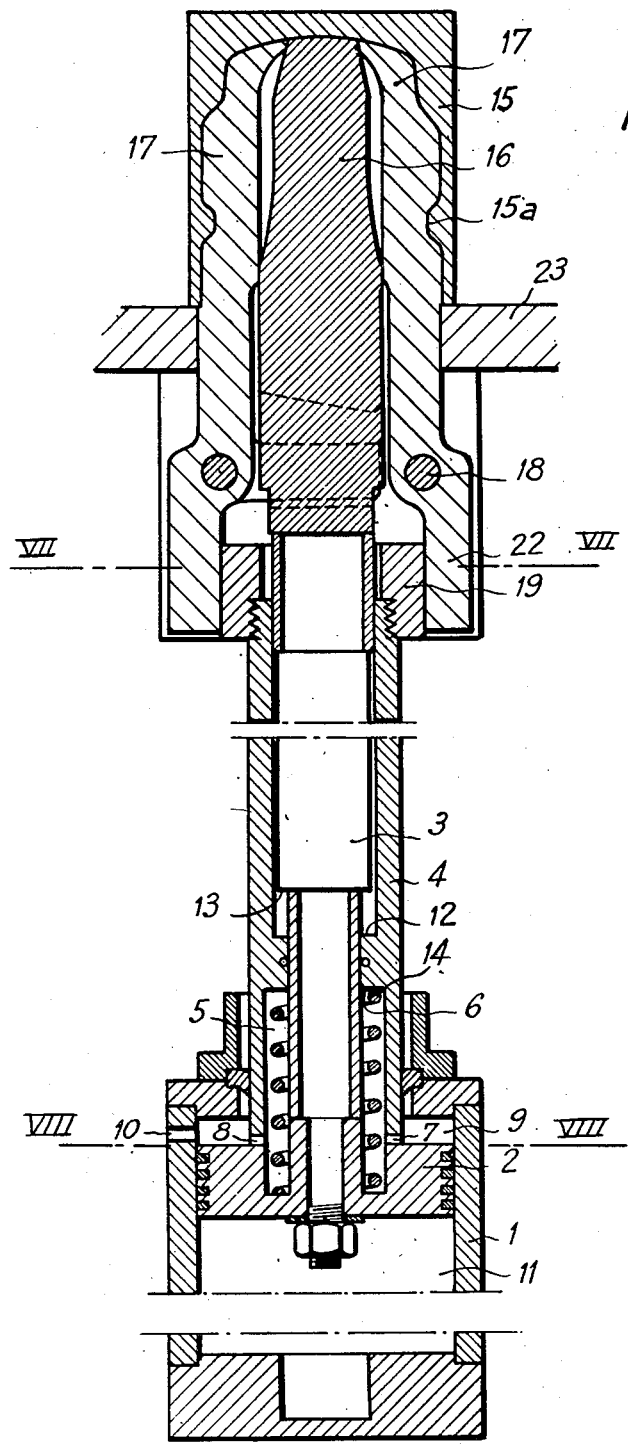
Fig. 1 is an axial section of the controlling device before stripping.

Such as it is represented in the drawings, the device according to the invention comprises a cylinder 1 in which is slidably mounted a first piston 2 solid with a rod 3. On this rod is slidably mounted a piston 4 which is relatively thick and in the lower portion of which is provided a chamber 5. The upper face 6 of this chamber and the lower edge 7 which is castellated at 8, constitute a piston. The chamber 9, situated above the piston 2 communicates with the chamber 5 through the space existing between the castellations 8 and is capable of being put in communication through a passage 10 with a source of fluid under pressure or with the exhaust. The chamber 11, situated under the piston 2, can also be put in communication with a source of fluid under pressure or with the exhaust by a passage not shown.

The piston 4 comprises an internal shoulder 12 and the piston rod 3 comprises an external shoulder 13 which is adapted to meet the shoulder 12 when the rod 3 moves downwards. A spring 14, placed in the chamber 5 and resting on the one hand against the top 6 of this chamber and on the other hand against the piston 2, tends to displace the piston 4 and the rod 3 to bring them in a relative position in which the shoulders 12 and 13 are in contact.

In the example represented, the controlling device is applied to the stripping of a core intended for the formation of a cast piece 15 which is provided with an internal projection or boss 15a. This core comprises a central key element 16 fixed on the rod 3 and two lateral elements 17 which are pivoted at 18 on a support 19 solid with the piston 4. Each of the lateral element 17 is solid with an appendix 20 which is engaged in a recess 21 provided to this end on the key 16, the width of the said appendix being less than the width of this recess, as seen in Figs. 4 and 5.

Each element 17 is also solid with an appendix 22 which is adapted to meet the base of the support 19, thereby limiting the pivoting of the element 17.

When a fluid is sent in the cylinder 1 by the passage 10, this fluid acts on the one hand on the faces 6 and 7 of the piston 4, the effect being to apply the support 19 against the working table 23. On the other hand, the fluid causes a downwards displacement of the piston 2. The central key element 16 therefore comes out of the moulded piece 15, the lateral elements remaining motionless at the beginning of this movement. Then the upper wall of the recesses 21 meets the appendices 20 of the lateral elements 17, which causes these elements to swing inwardly and to occupy the space left free by the key element, thereby disengaging themselves from the projection or boss 15a (Fig. 2).

At this moment, the shoulder 13 of the rod 3 comes in contact with the shoulder 12 of the piston 4 and the piston 2, continuing to move downwards, carries along with it this piston 4. The whole of the elements of the core therefore comes out of the cast piece 15 (Fig. 3).

By sending the fluid under pressure in the chamber 11 and putting the chamber 9 to exhaust, the elements of the core take again their initial position.

It is obvious that the invention is not limited to the embodiment described and shown and that modification can be made to it without departing from the scope of the invention as defined by the statement of claims.

What we claim is:

1. A pneumatic or hydraulic controlling device of the type referred to, adapted to perform the stripping of a mould core consisting of two elements, comprising a first piston movable in a cylinder, means for connecting the first piston to the first element to be controlled, a second piston movable with respect to the cylinder and the work face of which is less than that of the first piston, means for connecting the second piston to the second element to be controlled, a passage opening in the cylinder between the two pistons, a first stop solid with the first piston and a second stop solid with the second piston, these stops being so disposed that the first one meets the second one and carries it along after a certain displacement of the first piston.

2. A controlling device as claimed in claim 1 in which the first piston has a rod extending therefrom and the second piston is annular and disposed round the rod of the first piston.

3. A controlling device as claimed in claim 1, in which the stops are constituted by shoulders provided on a rod extending from the first piston and on the second piston.

4. A controlling device as claimed in claim 1 comprising resilient means tending to separate the two pistons.

5. A controlling device as claimed in claim 1 and intended for the stripping of cores used for casting pieces having internal projections, said cores comprising a central key element and lateral elements pivotally mounted on a support, the first piston and the second piston being respectively connected to the central key element and to the support and means being provided controlled by the displacement of the support relatively to the key element for causing the lateral elements to pivot inwardly in the space left free by the key element, thereby disengaging themselves from the internal projections of the cast piece.

References Cited in the file of this patent

UNITED STATES PATENTS

| 2,527,537 | Fahlman et al. | Oct. 31, 1950 |

FOREIGN PATENTS

| 553,517 | Great Britain | May 25, 1943 |
| 565,906 | Great Britain | Dec. 4, 1944 |